Patented Oct. 27, 1925.

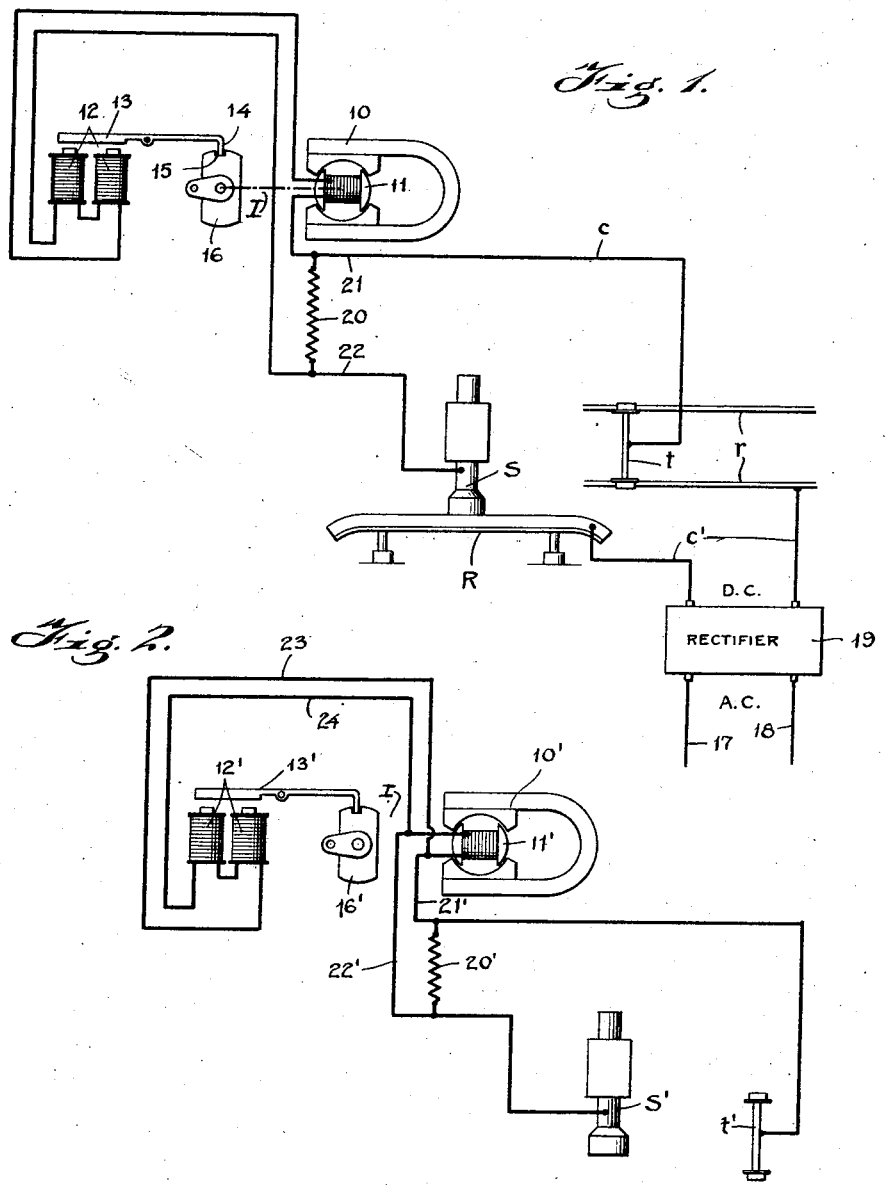

1,559,333

UNITED STATES PATENT OFFICE.

CLAUDE A. LYON, OF CHICAGO, ILLINOIS, ASSIGNOR TO THE REGAN SAFETY DEVICES COMPANY, INC., OF NEW YORK, N. Y., A CORPORATION OF NEW YORK.

TRAIN-CONTROL SYSTEM.

Application filed August 27, 1923. Serial No. 659,504.

*To all whom it may concern:*

Be it known that I, CLAUDE A. LYON, a citizen of the United States, and resident of Chicago, in the county of Cook and State of Illinois, have invented certain new and useful Improvements in Train-Control Systems, of which the following is a specification.

This invention relates to train control apparatus, and relates more particularly to a train control system in which are provided vehicle carried and roadside mechanism cooperating to produce indications on the vehicle in response to and in accordance with roadside conditions; and has special reference to the provision of a system in which vehicle carried mechanism responsive to direct current energization is associated with and operated by a roadside mechanism provided with alternating current equipment.

A principal object of the present invention comprehends the provision of a train control system in which the vehicle apparatus embodies an electro-responsive device which is operatable from the roadside, and in which means is provided for producing a sustained operation in the electro-responsive device under predetermined conditions of operation thereof, the invention being shown applied to a system in which the vehicle apparatus is equally adapted to roads equipped with alternating current or direct current signalling systems; and a coordinate object of the invention comprehends the provision of a system in which a D. C. vehicle carried mechanism is operated in response to changes in an A. C. roadside signalling apparatus to produce the train control indications.

The present invention in its more specific aspects relates to systems of the type disclosed in the application of A. G. Shaver, Serial No. 292,548, filed May 25, 1919. In these systems train control indications or effects are produced by the operation of a vehicle carried mechanism which includes an indication selector or relay connected with a vehicle carried shoe in a partial circuit, which circuit is completed by a roadside partial circuit when the shoe engages a ramp forming part of the roadside equipment, the completed circuit being energized by roadside direct current energy. In order to adapt the vehicle carried mechanism without modification to roadside apparatus and circuits employing alternating current energy sources, it is proposed to employ the vehicle carried mechanism responsive to direct current energization and to suitably rectify the roadside alternating current into direct current pulsations for transmission to the vehicle carried mechanism. I have found, however, that the apparatus in the vehicle carried partial circuit is not properly responsive to the pulsating rectified current furnished by a rectifier in the roadside equipment, it being practically impossible to operate the relay when connected directly to the rectifier in series when the roadside and vehicle partial circuits are completed into a single circuit.

I have discovered that the vehicle carried and roadside mechanism can be interrelated and constructed so as to obviate the difficulties hitherto found and so as to render the apparatus in the vehicle carried partial circuit responsive to the pulsating rectified current, and thus responsive to any interruptions therein due to the rectifier employed, and more specifically, that the relay can be rendered receptive to and operable by the rectified energy when connected in series with the rectifier by the completion of the partial circuit; and the provision of a system in which the relay is thus made operable and adaptable for reception to the rectified energy and thus to A. C. as well as D. C. roadside signalling circuits is a prime desideratum of my present invention.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention, and in which:—

Figure 1 is a diagrammatic view showing the cooperative vehicle carried and roadside mechanism, and Figure 2 is a modification of the vehicle carried mechanism.

Referring now more in detail to the drawings and more particularly to Fig. 1 thereof, the vehicle carried mechanism of my invention preferably includes an indication selector or relay generally designated as I arranged in a partial circuit generally designated as $c$ and a shoe S arranged to cooperate with a roadside mechanism including a ramp R connected in a roadside partial circuit $c'$, the vehicle carried and roadside partial circuits $c$ and $c'$ being adapted to be completed into a single circuit by the truck $t$ traveling over the rails $r$ when the shoe S engages the ramp R as shown in Fig. 1 of the drawings.

The indication selector I in the preferred form comprises a motor relay including the permanent magnet field 10, the electromagnet armature 11, the said armature being connected in the partial circuit $c$ so as to be energized in response to roadside conditions and when energized moved into any of a plurality of positions for operating electrical contacts (not shown) which control other vehicle or train control circuits. Preferably the selector includes a locking mechanism comprising the electromagnets 12 arranged for controlling the pivoted armature 13, the latter being provided with a locking hook 14 engaging a complemental notch 15 in a locking member 16, the latter being fixed to the shaft of the armature 11 as diagrammatically shown in the figure. The electromagnets 12 may be connected in series with the armature 11 in the partial circuit $c$ so that when the armature is energized the electromagnets 12 will also be energized to unlock the element 16 and permit movement of the armature into any of a plurality of positions, the armature and electromagnets being simultaneously deenergized to permit the armature to assume the neutral position shown in the figure, the said armature being locked in position by means of the locking elements 14, 15 and 16.

The roadside mechanism is controlled by an A. C. source of energy which may form part of the alternating current signalling system, the said A. C. energy source being diagrammatically indicated by the feed lines 17 and 18. The vehicle carried indication selector I is built so as to be responsive to direct current energization and to produce the desired operation thereof. The A. C. actuating current is rectified by means of a rectifier 19 which preferably comprises a vibrating rectifier of the battery charger type, the roadside partial circuit $c'$ being connected to the output end of the said rectifier and the A. C. source of energy connected to the input end thereof, as clearly shown in the drawings.

As heretofore mentioned, I have found that the vehicle carried partial circuit, and more specifically the armature 11 and electromagnets 12, do not properly respond to current transmitted from the rectifier 19 and from the roadside partial circuit $c'$ when this latter circuit is arranged in series with the vehicle carried circuit $c$ to form a completed circuit. I have discovered, however, that this deficiency may be substantially overcome or neutralized and the relay rendered properly responsive or receptive to the rectified energy. An effective way of accomplishing the desired result includes the insertion of a means in shunt with either the vehicle carried partial circuit or the roadside partial circuit which may be in the form of a resistance and preferably a non-inductive resistance in parallel with the inductive elements of the vehicle carried partial circuit $c$, this being shown in Fig. 1 by the non-inductive resistor 20 connected to the conductors 21 and 22 and hence in parallel with the armature 11 and electromagnets 12, the said armature and electromagnets being in series. I have discovered, furthermore, that the resistance of the resistor 20 preferably should bear a given relation to the ohmic resistance of the armature and the electromagnets to produce the best results, the resistance of the resistor 20 being to this end preferably made equal to the combined resistances of the armature 11 and electromagnets 12.

The theory or principle that I believe to be properly explanatory of the desirable effects produced, is that the parallel or shunt resistor forms a sustaining path for the current in the vehicle partial circuit during sudden interruptions in the completed circuit such as are produced by the vibrator of the rectifier 19. When the contact of the vibrator is closed, the partial circuits forming the completed circuit are closed, and current flows through the resistor 20 and through the armature and electromagnets 11 and 12 respectively. When the contact of the vibrator, however, is open, if no shunt path were present there would be a sudden collapsing of the magnetic field of the elements 11 and 12, causing the same to be rendered inoperative. However, due to the shunt path provided by the resistor 20, at each interruption of the vibrating rectifier 19 the current through the elements 11 and 12 will maintain itself due to the partial collapsing of its magnetic field through the closed circuit formed by the shunt. Due to the lag in the partial collapsing of the magnetic field, the current in the vehicle carried partial circuit maintains itself, and thus the elements 11 and 12 are not rendered inoperative. This effect is repetitive during the operation of the rectifier, and it results that the elements of the indication selector remain operative when needed. It will be apparent that any other undesirable momentary interruption in the completed circuit formed by the partial circuits will also be compensated, and will have no effect upon the desired sustained operation of the elements 11 and 12 of the vehicle carried mechanism. It will be understood, however, that this theory is given by way of explanation only, and not by way of limitation.

Referring now to Fig. 2 of the drawings,

I show a modification of the circuit connections in the vehicle carried mechanism, the resistor 20' being connected in parallel with the armature 11' by means of the conductors 21' and 22', the electromagnets 12' being also connected in parallel with the armature 11' by means of the conductors 23 and 24. I have found this latter arrangement to give the best results. The remaining parts of the vehicle carried mechanism in this exemplification of the invention are the same as those heretofore described, and are indicated by similar and primed reference characters.

While I have shown my invention in the preferred form, it will be obvious that many changes and modifications may be made in the structure disclosed. For example, the means for rendering the relay receptive to and operable by the rectified energy comprising the resistor may be connected in parallel with the rectifier on the roadside instead of on the vehicle. It will also be apparent that the rectifier may be mounted on the vehicle instead of fixed on the roadside with the resistor arranged in parallel thereto. The preferred construction, however, includes that above described and disclosed. It will be further apparent that other changes may be made in the apparatus without departing from the spirit of the invention defined in the following claims.

I claim:

1. In a train control system, vehicle carried mechanism including a device responsive to direct current energization and a vehicle carried circuit therefor, roadside mechanism including an alternating current source of energy, rectifying means embodying a current interrupter arranged for connecting the source of energy with so as to transmit the rectified energy to the vehicle carried circuit, and means connected to said vehicle carried circuit for rendering the device receptive to and operable by the rectified energy.

2. In a train control system, vehicle carried mechanism including a direct current relay and a vehicle carried circuit therefor, roadside mechanism including an alternating current source of energy, a vibrating rectifier arranged for connecting the source of energy with so as to transmit the rectified energy to the vehicle carried circuit, and means connected to the relay for rendering the same receptive to and operable by the rectified energy.

3. In a train control system, vehicle carried mechanism including a device responsive to direct current energization and a vehicle carried circuit therefor, rodside mechanism including an alternating current source of energy, a rectifying means embodying a current interrupter arranged for connecting the source of energy with so as to transmit the rectified energy to the vehicle carried circuit, and means associated with the vehicle carried mechanism for rendering the device receptive to and operable by the rectified energy.

4. In a train control system, vehicle carried mechanism including a direct current relay and a vehicle carried circuit therefor, roadside mechanism including an alternating current source of energy, a rectifying means arranged for connecting said source of energy with so as to transmit the rectified energy to the vehicle carried circuit, and a resistor connected in parallel with said relay for rendering the same receptive to the rectified energy transmitted to the vehicle carried circuit.

5. In a train control system, vehicle carried mechanism including a direct current relay and a vehicle carried circuit therefor, roadside mechanism including an alternating current source of energy, a rectifying means arranged for connecting said source of energy with so as to transmit the rectified energy to the vehicle carried circuit, and a non-inductive resistor connected in parallel with said relay for rendering the same receptive to the rectified energy transmitted to the vehicle carried circuit.

6. In a train control system, vehicle carried mechanism including a direct current relay and a vehicle carried circuit therefor, roadside mechanism including an alternating current source of energy, a rectifying means connected to said source of energy and a circuit connected to the rectifying means and associated with to transmit the rectified energy to the vehicle carried circuit, and a resistor connected in parallel with said relay for rendering the same receptive to the rectified energy transmitted to the vehicle carried circuit, the resistance of said resistor being substantially equal in magnitude to the ohmic resistance of the said relay.

7. In a train control system, vehicle carried mechanism including a direct current relay, a shoe and a partial vehicle carried circuit connecting said shoe and said relay, roadside mechanism including an alternating current source of energy, a rectifier connected to said source of energy, a ramp and a partial circuit connecting said ramp and said rectifier, the said partial circuit being adapted to be completed by the vehicle carried partial circuit when the shoe engages the ramp, and means associated with the vehicle carried mechanism for rendering the relay receptive to and operable by the rectified current in the completed circuit.

8. In a train control system, vehicle carried mechanism including a direct current relay, a shoe and a partial vehicle carried circuit connecting said shoe and said relay, roadside mechanism including an alternating current source of energy, a rectifier connected to said source of energy, a ramp and a partial circuit connecting said ramp and said rectifier, the said partial circuit being adapted to be completed by the vehicle carried partial circuit when the shoe engages the ramp, and a resistor connected in parallel with the said relay for rendering the same receptive to the rectified current in the completed circuit.

9. In a train control system, vehicle carried mechanism including a device responsive to direct current energization and a vehicle carried circuit therefor, roadside mechanism including an alternating current source of energy, means for rectifying said current and a circuit connected to the rectifying means and associated with to transmit the rectified energy to the vehicle carried circuit, and current sustaining means associated with said circuits for rendering the device receptive to and operable by the rectified energy.

10. In a train control system, vehicle carried mechanism including a direct current relay and a vehicle carried circuit therefor, roadside mechanism including an alternating current source of energy, a vibrating rectifier connected to the source of energy and a circuit connected to the rectifier and associated with to transmit the rectified energy to the vehicle carried circuit, and means associated with said circuits for rendering the relay receptive to and operable by the rectified energy.

11. In a train control system, vehicle carried mechanism including a direct current relay and a vehicle carried circuit therefor, roadside mechanism including an alternating current source of energy, a rectifying means connected to said source of energy and a circuit connected to the rectifying means and associated with to transmit the rectified energy to the vehicle carried circuit, and a non-inductive resistor connected in parallel with one of said circuits for rendering the relay receptive to the rectified energy transmitted to the vehicle carried circuit.

12. In combination, vehicle carried mechanism including a device responsive to direct current energization and a vehicle carried circuit therefor, roadside mechanism including an alternating current source of energy and a circuit therefor, means for transmitting the roadside energy to the vehicle to operate the device, said means including a current interrupting rectifying means and a current sustaining means for rendering the device receptive to and operable by the rectified energy.

13. In combination, vehicle carried mechanism including a device responsive to direct current energization and a vehicle carried circuit therefor, roadside mechanism including an alternating current source of energy and a circuit therefor, means for transmitting the roadside energy to the vehicle to operate the device, said means including a rectifying means connected to one of said circuits and a current sustaining means for rendering the device receptive to and operable by the rectified energy.

14. In a train control system, vehicle control mechanism comprising a vehicle carried electro-responsive device, a vehicle carried partial circuit therefor, a roadside partial circuit arranged for connection with the vehicle carried partial circuit to form a completed circuit, and means embodied in one of said partial circuits for causing the current flowing therein to be sustained during momentary interruptions in the completed circuit.

15. In a train control system, vehicle control mechanism comprising a vehicle carried electro-responsive device, a vehicle carried partial circuit therefor, a roadside partial circuit arranged for connection with the vehicle carried partial circuit to form a completed circuit, and means embodied in one of said partial circuits and arranged to be in shunt with said electro-responsive device for causing the current flowing therein to be sustained during momentary interruptions in the completed circuit.

16. In a train control system, vehicle control mechanism comprising a vehicle carried electro-responsive device, a vehicle carried partial circuit therefor, a roadside partial circuit arranged for connection with the vehicle carried partial circuit to form a completed circuit, and means embodied in the vehicle carried partial circuit and arranged in shunt with the electro-responsive device for causing the current flowing therein to be sustained during momentary interruptions in the completed circuit.

17. In a train control system, vehicle control mechanism comprising a vehicle carried electro-responsive device, a vehicle carried partial circuit therefor, a roadside partial circuit arranged for connection with the vehicle carried partial circuit to form a completed circuit, and a resistor embodied in one of said partial circuits for causing the current flowing therein to be sustained during momentary interruptions in the completed circuit.

18. In a train control system, vehicle control mechanism comprising a vehicle carried electro-responsive device, a vehicle carried partial circuit therefor, a roadside partial circuit arranged for connection with the vehicle carried partial circuit to form a completed circuit, and a resistor in shunt with the electro-responsive device for causing the current flowing therein to be sustained during momentary interruptions in the completed circuit, the resistance of said resistor being substantially equal in magnitude to the ohmic resistance of the electro-responsive device.

19. In a train control system, vehicle control mechanism comprising a vehicle carried relay, a vehicle carried shoe, a partial circuit including said relay and shoe, a roadside partial circuit including a ramp arranged for connection with the vehicle carried partial circuit to form a completed circuit, and means embodied in the vehicle carried partial circuit and arranged in shunt with the said relay for causing the current flowing therein to be sustained during momentary interruptions in the completed circuit.

Signed at Chicago, in the county of Cook and State of Illinois, this 1st day of August A. D. 1923.

CLAUDE A. LYON.